(12) United States Patent
Schmaus et al.

(10) Patent No.: US 6,303,566 B1
(45) Date of Patent: Oct. 16, 2001

(54) SENSORIAL ACTIVE SUBSTANCE

(75) Inventors: Gerhard Schmaus, Höxter-Bosseborn; Manfred Meier, Fürstenberg, both of (DE); Berthold Seggewiss, Greifensee (CH)

(73) Assignee: Dragoco Gerberding & Co. AG (DE)

( * ) Notice: Subject to any disclaimer, the term of this patent is extended or adjusted under 35 U.S.C. 154(b) by 0 days.

(21) Appl. No.: 09/538,142

(22) Filed: Mar. 29, 2000

(30) Foreign Application Priority Data

Mar. 29, 1999 (DE) ................................. 199 14 310

(51) Int. Cl.$^7$ ........................................ A61K 7/46
(52) U.S. Cl. .................................. 512/7; 424/76.4
(58) Field of Search ................. 512/7; 424/76.4

(56) References Cited

U.S. PATENT DOCUMENTS

| 3,653,920 | * | 4/1972 | Brinkman et al. | 99/140 R |
| 3,883,668 | * | 5/1975 | Sloot | 426/535 |
| 3,892,878 | * | 7/1975 | Wilson et al. | 426/534 |
| 3,959,509 | * | 5/1976 | Evers et al. | 426/535 |
| 4,504,508 | * | 3/1985 | Pittet et al. | 426/535 |

OTHER PUBLICATIONS

"Camembert Aromas. Demonstration of Other Minor Compounds", Dumont, J.P. et al., 1976.*

* cited by examiner

Primary Examiner—Jill Warden
Assistant Examiner—Monique T. Cole
(74) Attorney, Agent, or Firm—Pendorf & Cutliff

(57) ABSTRACT

Described is the use of 2,4,6-trithiaheptane as sensorial active substance. Further described are fragrance and/or aroma substance compositions which contain 2,4,6-trithiaheptane, as well as processes for the production thereof.

8 Claims, No Drawings

SENSORIAL ACTIVE SUBSTANCE

BACKGROUND OF THE INVENTION

1. Field of the Invention

The invention concerns the use of the known compound 2,4,6-trithiaheptane of Formula I as sensorial active substance (fragrance and/or flavoring substances).

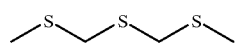

I

The invention further concerns fragrance and/or flavoring substance compositions which are characterized by containing 2,4,6-trithiaheptane, as well as processes for the production thereof.

2. Description of the Related Art 2,4,6-Trithiaheptane (CAS-No. 6540-86-9) can be produced by the technician in a conventional manner. Processes for production are disclosed for example in F. Feher and K. Vogelbruch; Chemical Reports 91, 996–1005 (1958) as well as in J. S. Grossert, D. L. Hooper and W. M. Neaves; Canadian Journal of Chemistry 59, 326–332 (1981).

In the fragrance and flavoring industry there is a constant demand for synthetic fragrance and flavor substances (food flavor additives) which can be produced economically and with consistent quality, which remain stable even in the case of prolonged storage in contact with other substances and which have desirable olfactory or flavor characteristics. Fragrance substances should have pleasant, preferably natural scent notes of sufficient intensity and be in condition to positively influence the fragrance of cosmetic or technical (industrial, commercial, cleaning substances, etc.) consumer goods. Aroma substances should have good human compatibility, evoke typical taste components of conventional food stuffs or even be identical therewith, and be able to complement or enhance the taste of consumables, orally administered medicaments, and the like in a positive manner. The discovery of fragrance and aroma substances which satisfy these requirements, has proven itself to be relatively cost and labor intensive and requires as a rule extensive research, particularly when interesting novel fragrance notes or taste directions are sought.

The search for suitable fragrance or aroma substances is understood by those working in this art to be made difficult in particular by the following technical considerations:

- the mechanism of the fragrance or flavor development is not known
- a quantitative characterization of a fragrance or flavor is not possible
- the relationship between the fragrance and/or flavor development on the one hand and the chemical structure of the sensorial active fragrance and/or flavoring substance on the other hand has not satisfactorily been researched
- frequently small changes in the structure of known fragrance or flavor substances can produce dramatic changes in the olfactory or taste characteristics and adversely affect the tolerance by the human being.

The success of the search for suitable sensorial active substances, that is, for suitable fragrance or flavor substances, thus depends frequently on the intuition of the researcher.

The known substance 2,4,6-trithiaheptane was disclosed in the pioneering work of Franz Feher and Kurt Vogelbruch as a colorless oil of little fragrance. In the later work of J. Stuart Grossert, Donald L. Hooper, and William M. Neaves it was indicated that 2,4,6-trithiaheptane synthesized by them was identical in aroma with the material which is obtained by the process of Feher and Vogelbruch.

It has, however, now surprisingly been discovered that the Feher and Vogelbruch description that 2,4,6-trithiaheptane is a compound with little odor, is incorrect.

SUMMARY OF THE INVENTION

The research of the present inventors has now conclusively shown that 2,4,6-trithiaheptane is extremely interesting both olfactorally and with respect to taste, wherein the sensorial characteristics of 2,4,6-trithiaheptane can be described as follows:

Sensorial Characteristics

Fragrance:
Leek, onion, cress, horseradish; mushroom-like, earthy, green tinge

Flavor:
Onion, leek, cress, radish, horseradish; mushroom-like, sharp 2,4,6-Trithiaheptane can be mixed in a conventional manner with the components employed for fragrance and taste compositions or, as the case may be, can be later added to such compositions. The goal thereby is always to adjust the proportion of 2,4,6-trithiaheptane in accordance with the desired olfactory or flavor effect (or according to: a suitable concentration) within the overall composition. In the aromatic and/or flavoring compositions the preferred parts by weight (=mass content) usually lies in the range of between $10^{-7}$ and $10^{-2}$, preferably in the range of between $10^{-6}$ and $10^{-3}$.

DETAILED DESCRIPTION OF THE INVENTION

In the following, the invention will be described in greater detail on the basis of the examples.

Beginning with typical base compositions, the effect is described which results from the addition or, as the case may be, the co-mixing of the inventive 2,4,6-trithiaheptane. The described olfactory and taste effects occur in similar manner also in different typical base compositions.

The amounts mentioned in the examples are respectively parts by weight.

EXAMPLE 1

| Champignon aroma (typical of fresh Champignons): | A | B |
|---|---|---|
| Neutral oil | 940.20 | 940.20 |
| 1-Octen-3-ol | 50.00 | 50.00 |
| iso-Amylakohol | 1.00 | 1.00 |
| Hexanol | 2.00 | 2.00 |
| Phenylethyl alcohol | 0.50 | 0.50 |
| 3-Octanone | 0.60 | 0.60 |
| 2-Octenal | 0.20 | 0.20 |
| Capronic acid | 3.00 | 3.00 |
| 1-Octen-3-yl-formate | 1.00 | 1.00 |
| Linalool | 1.50 | 1.50 |
| 2,4,6-Trithiaheptane 1% in Triacetin | — | 0.30 |
| | 999.70 | 1000.00 |

The aroma of the fragrance mixture A is made more intensive, natural, cabbage-like and typical Champignonlike by the addition of 2,4,6-trithiaheptane (Column B, 0.30 parts by weight of a 1% solution in triacetin).

EXAMPLE 2

| Leek Aroma | A | B |
|---|---|---|
| Neutral Oil | 997.60 | 997.60 |
| Dipropyldisulfide | 0.40 | 0.40 |
| Dipropyltrisulfide | 0.60 | 0.60 |
| Dimethylsulfide | 0.50 | 0.50 |
| Onion Oil | 0.50 | 0.50 |
| Asafetida-oil | 0.20 | 0.20 |
| Furaneol (10% in Triacetin) | 0.10 | 0.10 |
| 2,4,6-Trithiaheptane; 1% in Triacetin | — | 0.10 |
| | 999.90 | 1000.00 |

The aroma of the fragrance mixture A was made more intense by the addition of 2,4,6-trithiaheptane (Column B; 1.10 parts by weight of a 1% solution in triacetin. The sensorial profile of B is, in comparison to A noticeably changed and is characterized by a natural, fresh green and typical leek-like character.

EXAMPLE 3

| Galbanum-base (fragrance substance) | A | B |
|---|---|---|
| b-Pinene | 510 | 510 |
| a-Pinene | 110 | 110 |
| Limonene | 50 | 50 |
| 3-Carene | 80 | 80 |
| Myrcene | 40 | 40 |
| Camphene | 30 | 30 |
| b-Caryophyllene | 20 | 20 |
| 1,3,5-Undecatriene | 20 | 20 |
| a-Terpineol | 20 | 20 |
| a-Terpinylacetate | 20 | 20 |
| Thymolmethylether | 20 | 20 |
| 2-Isobutyl-3-methoxypyrazine (1% in Propyleneglycol) | 20 | 20 |

-continued

| Galbanum-base (fragrance substance) | A | B |
|---|---|---|
| sec-Butyl-3-methylbut-2-en-thioate | 20 | 20 |
| Linalool | 10 | 10 |
| 2,4,6-Trithiaheptane (1% in Propyleneglycol) | — | 30 |
| | 970 | 1000 |

The fragrance of the aromatic substance mixture A was made more intensive and typically galbanum oil-like by the addition of 2,4,6-trithiaheptane (Column B: 30 parts by weight of a 1% solution in propyleneglycol). In comparison to A, the head-note of the Base B smells more natural and more strongly green-sulfurous.

What is claimed is:

1. A method for enhancing the organoleptic properties of a food or cosmetic, comprising adding to said food or cosmetic an organoleptic effective amount of 2,4,6-trithiaheptane.

2. A method as in claim 1, wherein said organoleptic property is a leek, onion, cress, horseradish, mushroom-like, earthy, green tinge fragrance.

3. A method as in claim 1, wherein said organoleptic property is an onion, leek, cress, radish, horseradish, mushroom-like, sharp flavor.

4. A fragrance and/or flavor substance comprising 2,4,6-trithiaheptane.

5. A fragrance and/or flavor substance according to claim 4, wherein the weight ratio of 2,4,6-trithiaheptane to the total fragrance and/or flavor substance is in the range of between $10^{-7}$ and $10^{-2}$.

6. A fragrance and/or flavor substance according to claim 4, wherein the weight ratio 2,4,6-trithiaheptane to the total fragrance and/or flavor substance is in the range of between $10^{-6}$ and $10^{-3}$.

7. A fragrance and/or flavor additive comprising 2,4,6-trithiaheptane.

8. A process for production of a fragrance and/or aroma modifying composition, wherein 2,4,6-trithiaheptane is mixed or added to conventional components of a fragrance and/or flavor substance composition.

* * * * *